United States Patent
Bahnasy et al.

(10) Patent No.: US 11,848,868 B2
(45) Date of Patent: Dec. 19, 2023

(54) METHODS, SYSTEMS AND DEVICES FOR NETWORK MANAGEMENT USING CONTROL PACKETS

(71) Applicant: HUAWEI TECHNOLOGIES CO., LTD., Shenzhen (CN)

(72) Inventors: Mahmoud Mohamed Bahnasy, Waterloo (CA); Shiva Ketabi, Kanata (CA); Sepehr Abbasi Zadeh, Waterloo (CA); Yashar Ganjali, Kanata (CA); Fenglin Li, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 17/488,893

(22) Filed: Sep. 29, 2021

(65) Prior Publication Data

US 2023/0098201 A1    Mar. 30, 2023

(51) Int. Cl.
*H04L 47/12*   (2022.01)
*H04L 47/2466*   (2022.01)
*H04L 47/11*   (2022.01)

(52) U.S. Cl.
CPC .............. *H04L 47/12* (2013.01); *H04L 47/11* (2013.01); *H04L 47/2466* (2013.01)

(58) Field of Classification Search
CPC ......... H04L 45/26; H04L 45/38; H04L 47/11; H04L 47/12; H04L 47/263; H04L 47/267
See application file for complete search history.

(56) References Cited

U.S. PATENT DOCUMENTS

| | | | |
|---|---|---|---|
| 11,206,579 B1* | 12/2021 | Ward, Jr. | ........... H04M 15/8214 |
| 2006/0168272 A1* | 7/2006 | Rustad | ................ H04L 43/0858 |
| | | | 709/230 |
| 2007/0133418 A1* | 6/2007 | Agarwal | ............... H04W 80/06 |
| | | | 370/236 |
| 2015/0019716 A1 | 1/2015 | Kim et al. | |
| 2015/0381541 A1 | 12/2015 | Zhang | |

(Continued)

FOREIGN PATENT DOCUMENTS

| | | | |
|---|---|---|---|
| CN | 108512774 A | | 9/2018 |
| CN | 111034254 A | | 4/2020 |
| CN | 201910631286.6 | * | 4/2020 |

OTHER PUBLICATIONS

Tan, Lizhuang, et al. "In-band network telemetry: A survey." Computer Networks 186 (2021): 107763.

(Continued)

*Primary Examiner* — Pao Sinkantarakorn
*Assistant Examiner* — Kabir U Jahangir (57) ABSTRACT

There is provided methods and devices for network management. A method includes receiving at least one data flow, transmitting in-band management packet periodically for each of the at least one data flow, receiving in-band acknowledgement packets for each of the at least one data flow, and producing network management data based on received in-band acknowledgement packets. A device includes a processor, and a non-transient computer readable memory having stored thereon machine executable instructions which when executed by the processor configure the device to execute the methods disclosed herein. A system includes a source node, a receiver and a data-plane device, the system configured to execute the methods disclosed herein.

20 Claims, 7 Drawing Sheets

(56) References Cited

U.S. PATENT DOCUMENTS

| | | | |
|---|---|---|---|
| 2016/0226703 A1 | 8/2016 | Grinshpun | |
| 2020/0084155 A1 | 3/2020 | Song | |
| 2020/0119988 A1 | 4/2020 | Castellanos | |
| 2020/0322216 A1 | 10/2020 | Singla | |
| 2021/0112002 A1* | 4/2021 | Pan | H04L 47/12 |
| 2021/0203578 A1* | 7/2021 | Li | H04L 43/0858 |
| 2022/0014478 A1 | 1/2022 | Lee | |
| 2022/0046466 A1 | 2/2022 | Sridhar | |
| 2022/0060422 A1 | 2/2022 | Sommers | |
| 2022/0209861 A1* | 6/2022 | Baer | H04B 7/18513 |
| 2022/0239571 A1 | 7/2022 | Rangarajan | |
| 2022/0255820 A1 | 8/2022 | Biradar | |
| 2022/0417323 A1 | 12/2022 | Julien | |

OTHER PUBLICATIONS

N. Parvez, A. Mahanti and C. Williamson, "TCP NewReno: Slow-but-Steady or Impatient?," 2006 IEEE International Conference on Communications, 2006, pp. 716-722, doi: 10.1109/ICC.2006.254792.

Alizadeh, Mohammad, et al. "Data center TCP (DCTCP)", Proceedings of the ACM SIGCOMM 2010 Conference, 2010.

Hu et al., "Aeolus: A Building Block for Proactive Transport in Datacenters", SIGCOMM 2020, Aug. 10-14, 2020.

RFC: 793, Transmission Control Protocol, Darpa Internet Program, Protocol Specification, Sep. 1981, prepared for Defense Advanced Research Projects Agency, by Information Sciences Institute, University of Southern California, 4676 Admiralty Way, Marina del Rey, California 90291.

Cardwell et al., "Measuring bottleneck bandwidth and round-trip propagation time", BBR: Congestion-Based Congestion Control, Sep.-Oct. 2016, Acmqueue, pp. 1-34.

Digital Systems and Networks, Packet over Transport aspects—Ethernet over Transport aspects, Internet protocol aspects—Operation, administration and maintenance, OAM functions and mechanisms for Ethernet based networks, 2013.

Li, Yuliang et al., HPCC: High Precision Congestion Control, Alibaba Group, Harvard University, University of Cambridge, Massachusetts Institute of Technology, SIGCOMM, Aug. 19-23, 2019, total 15 pages.

Brockners, F., Ed. et al., Data Fields for In-situ OAM, draft-ietf-ippm-ioam-data-12, Feb. 21, 2021, total 52 pages.

Alibaba et al., In-band Network Telemetry (INT) Dataplane Specification, Version 2.1, Nov. 11, 2020, https://p4.org/p4-spec/docs/INT_v2_1.pdf, total 56 pages.

Zhu, Yibo, et al. "ECN or Delay: Lessons Learnt from Analysis of DCQCN and Timely." Proceedings of the 12th International on Conference on emerging Networking Experiments and Technologies, Dec. 6, 2016, total 15 pages.

Kumar, Gautam, et al. "Swift: Delay is simple and effective for congestion control in the datacenter." Proceedings of the Annual conference of the ACM Special Interest Group on Data Communication on the applications, technologies, architectures, and protocols for computer communication, Jul. 30, 2020, total 15 pages.

Cisco Systems, Inc., In-band OAM for IPv6, https://www.cisco.com/c/en/us/td/docs/ios-xml/ios/ipv6_nman/configuration/15-mt/ip6n-15-mt-book.html, Nov. 21, 2012, total 36 pages.

Samsung, Overview of flow control solutions, 3GPP TSG-RAN WG3 Meeting #103, R3-190435, Athens, Greece, Feb. 25-Mar. 1, 2019, 5 pages.

* cited by examiner

METHODS, SYSTEMS AND DEVICES FOR NETWORK MANAGEMENT USING CONTROL PACKETS

CROSS-REFERENCE TO RELATED APPLICATIONS

This is the first application filed for the present disclosure.

FIELD

The present disclosure pertains to the field of computer networking, and in particular to methods, systems and devices for network management and/or control.

BACKGROUND

There are three main aspects of data center network control, namely i) Network Monitoring (to collect and analyze network statistics), ii) Applying proper control mechanisms, and iii) Maximizing resource utilization and fairness among all flows. For example, congestion control mechanisms require a Network Monitoring function to detect congestion. Packet loss is the most commonly used signal to identify network congestion.

However, packet loss is either a late indication of congestion (Queue is already full), or it is a false indication as it might occur for other reasons (packet corruption). Some variants of Transmission Control Protocol (TCP) use Explicit Congestion Notification (ECN) marking (e.g., Data Center Transmission Control Protocol (DCTCP), Data Center Quantized Congestion Notification (DCQCN) or Round Trip Time (RTT) (e.g., TCPVegas, Timely, BBR, and Swift) or try to infer available bandwidth (e.g., TCP Westwood+).

ECN marking depends on queue length which is a very noisy signal. Moreover, RTT includes both the queuing delay at the bottleneck plus the variations in queuing delay at all the other queues in the bath. Available bandwidth estimation is also based on inter-packet interval, which suffers from the same noisy effect as RTT. Thus, one can conclude that these metrics are very noisy and not reliable. Some TCP variants try to read network state directly from switches using In-band Network Telemetry (INT). However, switches lack critical knowledge about flows state.

A different approach to achieve robust networks is to increase buffer size inside the switches. However, this often adds intolerably long packet delays and jitter.

In addition, a proper controlling mechanism is required to control the amount of data entering the network. Congestion Control algorithms typically use either congestion windows or transmission rates.

Accordingly, there is a need for methods and devices with low overhead to provide better network visibility and to propagate such information fairly among all data flows, that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods and devices for network management using in-band control packets.

An aspect of the disclosure provides for a method for network management. The method includes receiving at least one data flow. The method further includes transmitting in-band control packets periodically for each of the at least one data flow. The method further includes receiving in-band acknowledgement packets for each of the at least one data flow. The method further includes producing network management data based on received in-band acknowledgement packets.

In some embodiments producing network management data based on received in-band acknowledgement packets comprises outputting the network management data for adjusting transmission parameters. In some embodiments producing network management data based on received in-band acknowledgement packets comprises adjusting the transmission of the at least one data flow. In some embodiments the in-band control packets are identified as low priority packets for low priority transmission by data-plane devices. In some embodiments the in-band control packets are transmitted at regular time periods. In some embodiments the network management data indicates congestion based on a number of in-band control packets forwarded. In some embodiments the network management data indicates congestion based on a number of in-band control packets delayed. In some embodiments the network management data indicates congestion based on a data packet queue build-up. In some embodiments the network management data indicates congestion based on a number of data flows sharing a data path. In some embodiments the network management data indicates congestion based on an inter-arrival time between consecutively received in-band acknowledgement packets. In some embodiments the number of data flows sharing a data path is obtained by a difference of a number of control packets counted by a data-plane device over two measurement periods of fixed time length, divided by a number of control packets per flow per the fixed time length. In some embodiments receiving the at least one data flow is performed by a control packet generator at a source node. In some embodiments transmitting in-band control packets periodically for each of the at least one data flow is performed by a control packet generator at a source node. In some embodiments receiving in-band acknowledgement packets for each of the at least one data flow is performed by a control packet analyzer at the source node. In some embodiments producing network management data based on received in-band acknowledgement packets is performed by a micro-control process at the source node.

An advantage of the present disclosure is that enriching existing protocols (for example, TCP) with the control packet (scout) service allows for better bandwidth recovery and faster reaction times. The early reaction prevents buffer bloating and, consequentially, reduces latency and jitter. In addition, it allows the control packet-enriched systems to operate very close to the maximum resource occupancy. Further, by adding flow count information to control packets, hosts can adjust transmission rates after one RTT to their fair share. In addition, such methods allow flows to reach maximum link utilization in one RTT.

Another aspect of the disclosure provides for a computing device. The computing device includes a processor, and a non-transient computer readable memory having stored thereon machine executable instructions which when executed by the processor configure the device to execute the methods disclosed herein. For example, such a computing device is configured to receive at least one data flow, transmit in-band control packets periodically for each of the at least one data flow, receive in-band acknowledgement packets for each of the at least one data flow, and produce network management data based on received in-band acknowledgement packets.

Another aspect of the disclosure provides for a system. The system includes a source node, a receiver and a data-plane device. The source node is configured to receive at least one data flow, transmit in-band control packets periodically for each of the at least one data flow, receive in-band acknowledgement packets for each of the at least one data flow, and produce network management data based on received in-band acknowledgement packets. The receiver is configured to receive in-band control packets for each of the at least one data flow, and transmit in-band acknowledgement packets for each of the at least one data flow. The data-plane device is configured to transmit the in-band control packets as low priority packets.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure provide a low overhead method to provide network management data, for example for the purpose of controlling congestion of data flows. Some embodiments provide better network visibility and propagate information fairly among all data flows. This method may be referred to herein as a control packet service. Such a control packet service includes the transmission of in-band control packets for the purpose of ascertaining network conditions. In some embodiments, the in-band control packets will be transmitted periodically as low priority packets.

In some embodiments, the control packet service introduces four signals, along with a mechanism to estimate them, for better network visibility. These signals are i) bandwidth credit, ii) queue busyness, iii) prediction of queue build-up, and iv) number of active flows. With the extra signals provided by the control packet service, enhancements may be made to existing protocols (for example, TCP or its variants) to yield better performance and low buffer size requirements. Embodiments of the present disclosure further provide design of a new congestion control mechanism. In-band control packets as referred to herein are in-band flow control packets. In-band control packets may also be referred to herein as "scout packets" or simply "scouts."

As used herein, queue busyness refers to the period of time that the data queue was busy serving normal traffic, measured from the time that the control packets arrived at the data-plane device. In other words, queue busyness is the time that the link was fully utilized since control packets arrived at the data-plane device. As used herein, bandwidth credit (bw_cr) refers to the amount of data that the switch may forward for the subject data flow in addition to its current load. As used herein, network management may be taken to include, without limitation, aspects of network monitoring, as well as aspects of network control. As used herein, data flow may be taken to mean a sequence of packets between a source node and a destination, which may be another host, a multicast group, or a broadcast domain, for example, a TCP data flow. It should be appreciated that a data flow can also be referred to as traffic flow, packet flow or network flow, and is a sequence of packets from a source computer to a destination.

Figure 1:
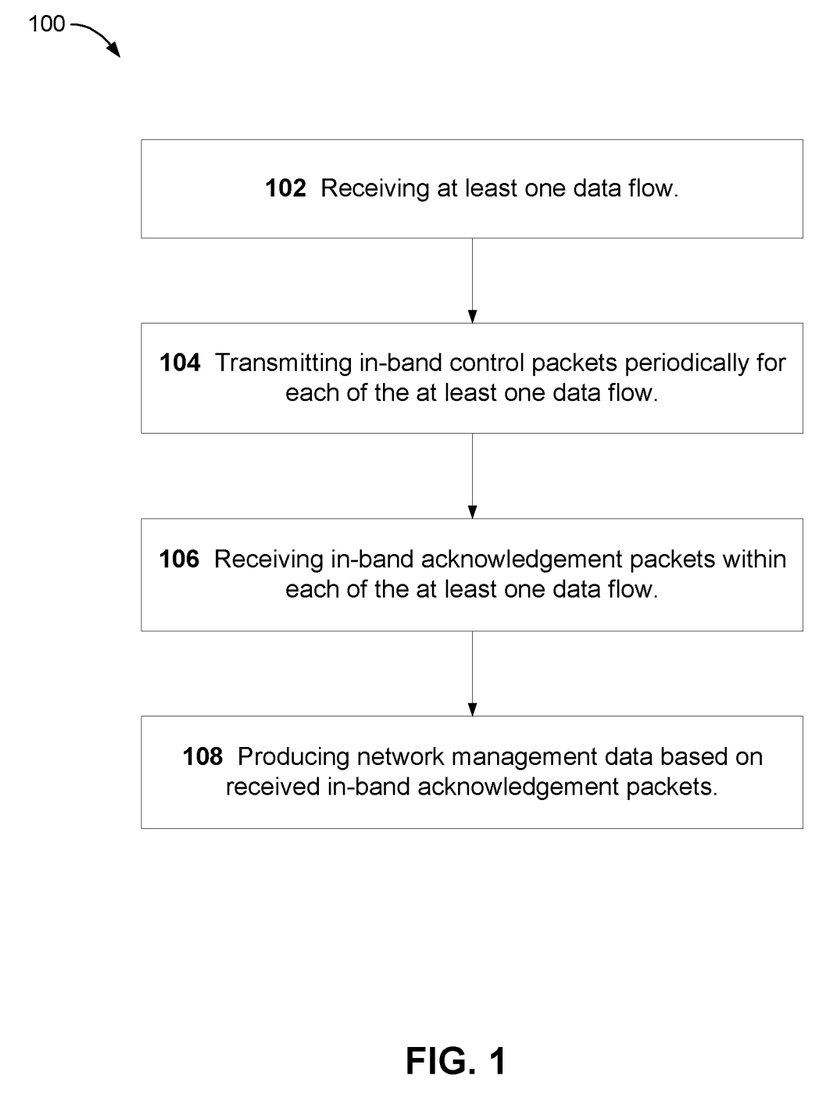
FIG. 1 depicts an example method for network management, according to embodiments.

FIG. 1 is flowchart of an example method 100 for network management. The method 100 involves, at step 102, receiving at least one data flow. The method 100 further involves, at step 104, transmitting in-band control packets periodically for each of the at least one data flow. The method 100 further involves, at step 106, receiving in-band acknowledgement packets for each of the at least one data flow. The method 100 concludes, at step 108, by producing network management data based on received in-band acknowledgement packets.

In embodiments of the present invention, control packets are sent alongside normal traffic with low priority to be forwarded in different ways based on their objective. Such a feature can be achieved in commodity data-plane devices, such as switches, using a strict priority queue.

In some embodiments, producing network management data based on received in-band acknowledgement packets comprises adjusting the transmission of the at least one data flow.

In some embodiments the in-band control packets are identified as low priority packets for low priority transmission by data-plane devices. An example of a data-plane device may be a switch or a router that is utilized for forwarding packets. The data-plane device may be configured to only forward control packets when the network is idle.

In some embodiments, the in-band control packets are transmitted at regular time periods. The length of time in these regular periods may be variable, but each regular period may still have the same length. As used herein, periodically may be taken to mean at regular time intervals. In some embodiments, periodically may be taken to mean every x number of seconds. In some embodiments, periodically may be taken to mean every y number of packets.

Figure 2:
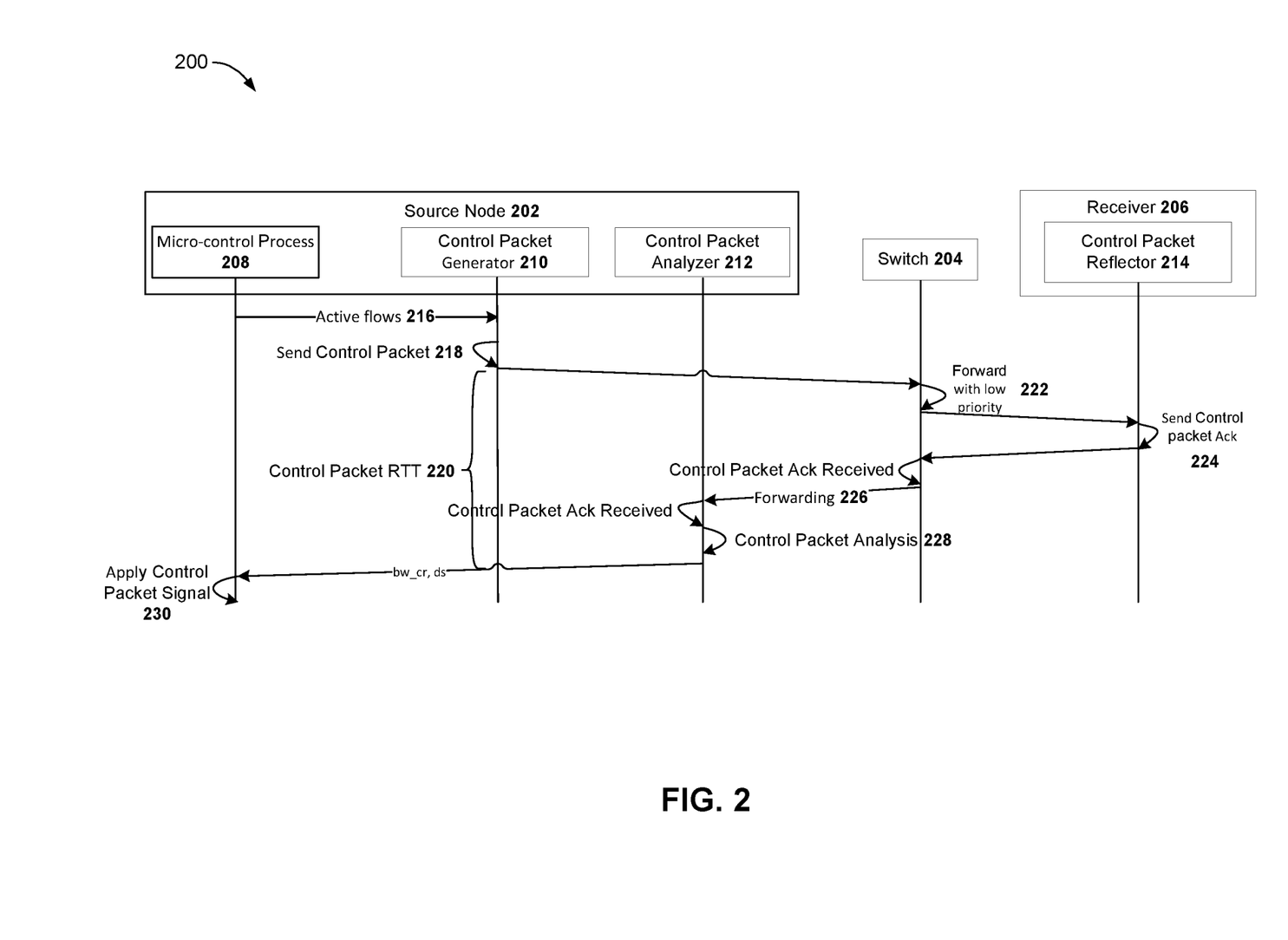
FIG. 2 depicts an example message exchange system in a control packet service, according to embodiments.

FIG. 2 depicts an example message exchange system 200 in a control packet service. In the message exchange service there is a source node 202, a switch 204 and a receiver 206. The source node 202 contains subcomponents of a micro-control process 208, a control packet generator 210 and a control packet analyzer 212. The receiver 206 contains a control packet reflector 214. Active data flows 216 are sent from the micro-control process 208 to the control packet generator 210. At step 218, the control packets are sent by the control packet generator 210 to the switch 204. The switch 204 will then forward the control packet with low priority at step 222 to the control packet reflector 214. The control packet reflector 214 then sends a control packet acknowledgement at step 224 to the switch 204. The switch 204 then forwards the control packet acknowledgement to the control packet analyzer 212 at step 226, where control packet analysis is performed at step 228. The control packet analysis is then provided to the micro-control process 208 for applying the control packet signal 230 (such as bandwidth credit (bw_cr) or scout delay (ds)). The time taken from sending the control packet from the control packet generator 210 to receiving the in-band acknowledgement packets at the control packet analyzer 212 is the control packet round trip time (RTT) 220. In some embodiments producing network management data based on received in-band acknowledgement packets is performed by the micro-control process 208 at the source node. Advantageously, for some embodiments, no switch modification is required switch 204.

Control packets may be sent using, for example, i) a parallel user datagram protocol (UDP) socket, ii) within the same TCP socket after setting priority as a flag to discriminate management traffic, iii) within the TCP socket after adding a custom flag at the TCP layer. Using UDP socket to send a control packet is easier to implement. However, using the same TCP socket allows control packets to be served through the same data path in case of using equal-cost multi-path routing (ECMP). The management service allows each host to send control packets with a fixed rate alongside TCP traffic. At the switch side, normal traffic is served with strict priority, while management traffic is served only when the output port is idle. Management traffic can only fill in the gaps between normal traffic packets. Such behavior is an implicit guarantee from data-plane devices, such as network switches, that it can serve an extra number of packets that is equal to control packets. Such a signal is referred to herein as a "Bandwidth Credit". In addition, extra delay encountered by control packet is used to infer the queue busyness which is directly related to link utilization. It can also be used as an early indication of congestion. Finally, by adding a counter at the switch per egress port and having a consensus among all flows on the counting period, the number of active flows may be provided in one RTT.

As control packets are sent with low priority, switches drop them in case of contention. This guarantees that the received packets do not exceed the maximum link capacity. By applying such action to all flows, better fairness may be provided. Control packets might cause a small delay for normal traffic if the latter arrives while serving the former. This effect is reduced by using a small control packet size (for example, 64 bytes) and can be reduced further by using packet pre-emption (for example, IEEE 802.1Qbu).

In some embodiments, control packets may be sent between each pair of hosts and the received signal may then be distributed among all active flows between this pair of hosts. For example, bandwidth credits may be distributed equally among all active flows, and queue busyness may be conveyed to all active flows.

Control packets also may be used to carry normal data to reduce network overhead. However, it is proposed to use such an approach only for the first RTT and to allow new flows to start transmission with the line rate. After receiving management acknowledgements, hosts should have enough estimation of their fair share that can be used as the initial congestion window (CWND). Marking all control packets for drop is also proposed, using ECN, bit if they exceed the maximum scout window size that all hosts use for transmission.

In some embodiments receiving the at least one data flow is performed by a control packet generator at a source node.

In some embodiments transmitting in-band control packets periodically for each of the at least one data flow is performed by a control packet generator at a source node.

Figure 3:
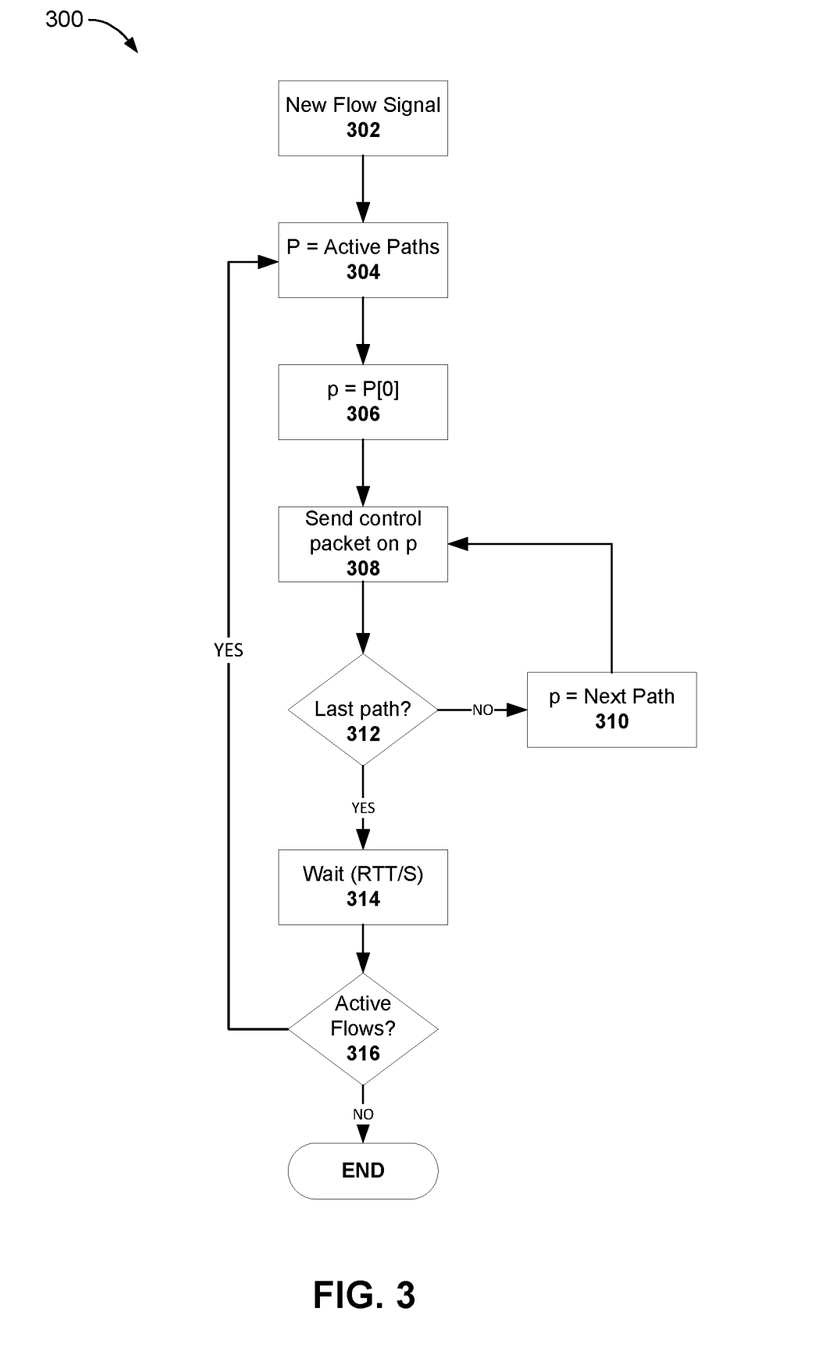
FIG. 3 depicts an example flowchart for control packet generation, according to embodiments.

FIG. 3 depicts an example flowchart 300 for control packet generation at a control packet generator, such as control packet generator 210 at source node 202 in FIG. 2. The control packet generator 210 is required to generate control packet per data path. Therefore, all flows that originate from the source node and share one data path need only one instance of a control packet generator. A new flow signal is received at step 302 by the control packet generator. At step 304, P is an array that is set equal to the number of active paths. Then, at step 306, current path p is set equal to P[0], the first active path. It will be understood that P is the whole set of active paths, while p is one path in the set. (i.e., p is an element in the set or array P). A control packet is then sent on path p at step 308. At step 312, p is checked and if it is not the last path, then at step 310 p is updated to be the next path in the array of active paths, after which the process returns to step 308. However, if P is the last path, then the process waits, at step 314, for a period of time to elapse, the period of time equal to the round trip time divided by a window size (SW) of the control packet. At step 316, if there are more active flows, the system returns to step 304 to set P equal to the active paths. If there are no more active flows, then the process ends.

In some embodiments producing network management data based on received in-band acknowledgement packets comprises outputting the network management data for adjusting transmission parameters. By servicing low priority control packets to estimate network states in different ways, network devices implicitly guarantee that they can serve more traffic equivalent to the served control packets. In addition, in case of congestion, control packets magnify the effect of the delay as they are delayed in a low priority queue. Therefore they provide rich information about line occupancy. Hence, in some embodiments the control packet service provides four extra signals for better network visibility.

Figure 4:
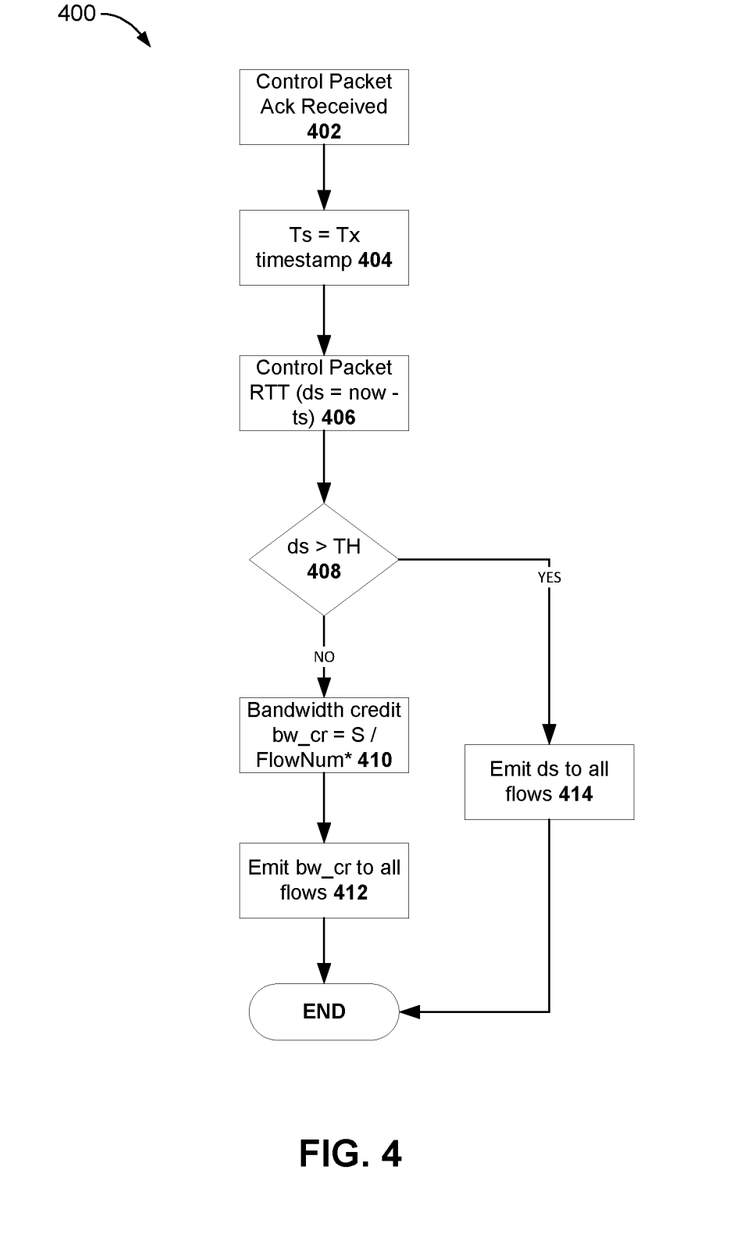
FIG. 4 depicts an example flowchart for a control packet analyzer, according to embodiments.

In some embodiments receiving in-band acknowledgement packets for each of the at least one data flow is performed by a control packet analyzer at the source node, such as control packet analyzer 212 at source node 202 in FIG. 2. FIG. 4 depicts an example flowchart 400 for a control packet analyzer. The control packet analyzer is responsible for receiving control packets acknowledgements and extracting control and management data from said control packets. This management data reflects the network state such as congestion or bandwidth availability. Later, the control packet analyzer outputs this data to the micro-control process, which uses it to control traffic transmission. While the micro-control process may be illustrated in the appended drawings to be collocated within the same source node as the control packet analyzer, it should be appreciated that in other embodiments the control process may be located in a different network entity. The control packet analysis may be performed per path. At step 402, a control packet acknowledgement is received. At step 404, the transmission timestamp (Ts) is set equal to the Tx for a timestamp. At step 406, the control packet delay is determined as being the scout delay (ds) time, equal to the receiving time minus the transmission timestamp (Ts). Then it is determined at step 408 whether the scout delay time is greater that the threshold TH (which is five times the network RTT). If the scout delay time is great than the TH, then at step 414 the scout delay time is emitted to all flows before the process ends. If however the scout delay time is not greater than the threshold TH, then the bandwidth credit is set equal to the size of the control packet (S), at step 410. If multiple data flows originate from the same source node and share the same data path, the bandwidth credit is to be divided among all flows equally. The bandwidth credit is then emitted to all flows at step 412 before the process ends.

In some embodiments the network management data indicates congestion based on a number of in-band control packets forwarded. This number of in-band control packets forwarded may be referred to as bandwidth credit. Utilizing with the present invention, TCP protocol, for example, may choose to inject control packets with low priority to detect bandwidth availability. Control packets are not trying to estimate available bandwidth, rather they attempt to gain implicit permission from the network to use a certain limit of extra bandwidth through certain data-path. Hence, the underlying TCP protocol can increase its congestion window faster to recover available bandwidth. Once a control packet of size S is received, it indicates that all switches through the data path can allocate at least S bytes for that flow (conservative approach) or higher (optimistic approach). Such a signal is not affected by the number of switches or accumulated delay through the data path.

Figure 5:
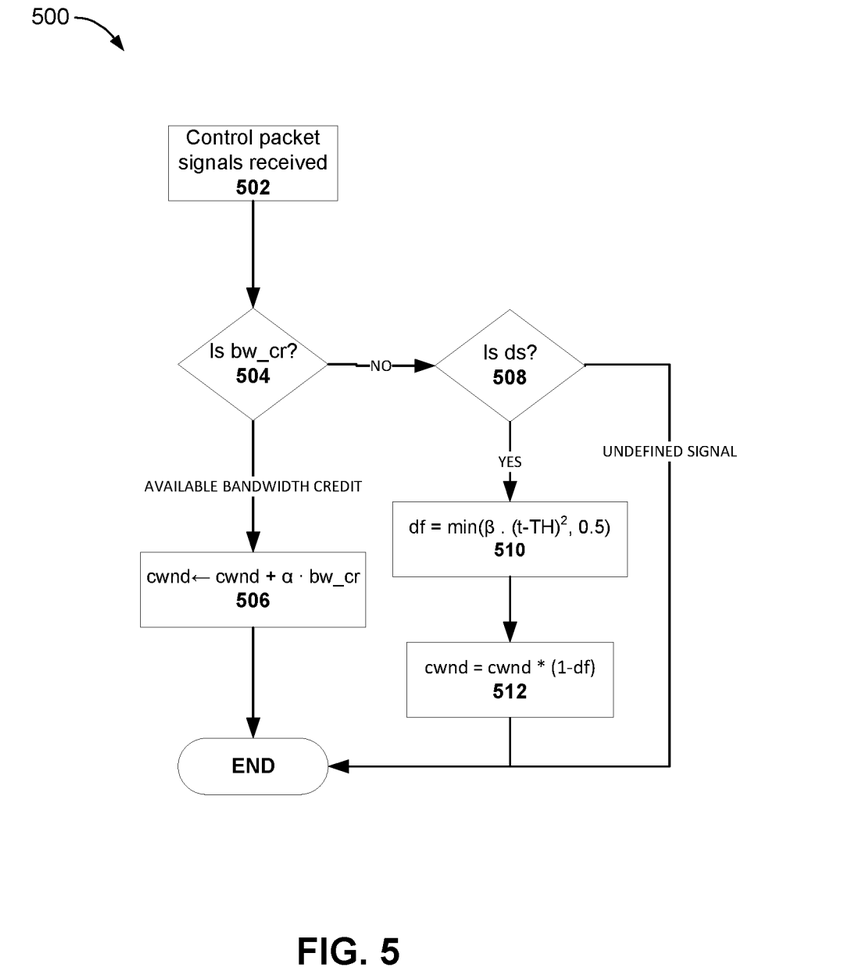
FIG. 5 depicts an example flowchart for an augmented TCP process, according to embodiments.

FIG. 5 depicts an example flowchart 500 for an augmented TCP process. At step 502, control packet signal are received. If the signal is determined, at step 504, to be a bandwidth credit (bw_cr), then it is assumed that there is available bandwidth credit. At step 506, the congestion window (cwnd) is set equal to the previous congestion window plus the bandwidth credit before the process ends. If however, the signal at step 504 was not a bandwidth credit signal, then it is determined whether it is a scout delay (ds) at step 508. If the signal is a scout delay, then the decrease factor (df) is set at step 510 to be df=min($\beta \cdot (t-TH)^2$, 0.5) and the congestion window is set at step 512 to be the previous congestion window multiplied by one minus the decrease factor, before the process ends. If the signal at step 508 is not determined to be a scout delay, then the signal is undefined and returned to step 502.

In some embodiments the network management data indicates congestion based on a number of in-band control packets delayed. This period of time that has elapsed since the last control packet may be called queue busyness. Stalling control packets in the low priority queue is a direct indication of a busy output queue. Once the link occupancy reaches the maximum value, control packets get stalled in the low priority queue, which is referred to herein as "scout delay". Therefore, the time elapsed since the receiving of last scout may also be used as an early indication of congestion.

In some embodiments the network management data indicates congestion based on a data packet queue build-up. This may also be a prediction of data packet queue build-up. As the in-band control packets are sent with low priority, the control delay starts to increase at an earlier time than when the queue starts to build up. Therefore, the control packet service may detect congestion before queues start to build up.

In some embodiments the network management data indicates congestion based on a number of data flows sharing a data path. This may be achieved by sending a single control packet with certain instructions that could be executed and retrieving the results from the data-plane. An example of such a method is to assist the data-plane devices in identifying active flows by sending scouts to simulate a heartbeat signal. The data-plane device (such as a switch) then uses a counter to count the number of active flows. In some embodiments, for some network switches, the switch may be configured to implement an extra counter per port. However, as stated, advantageously, no switch modification is required for other embodiments.

A person of skill in the art will reasonably appreciate that such signals may be used, without limitation, for i) enhancing existing congestion control protocols, ii) building new congestion control, iii) estimating the number of active flows. Such signals may also be used for a variety of decisions, such as load balancing decisions, or routing decisions. While the TCP protocol is used as an example herein, those skilled in the art will understand that the application of the invention in the present disclosure are not limited to only the TCP protocol.

In some embodiments the network management data indicates congestion based on an inter-arrival time between consecutively received in-band acknowledgement packets. In such embodiments, control acknowledgements work as credits or an indication of bandwidth availability. For example, a TCP window size may be increased directly by these credits. At the same time, the inter-arrival times between control acknowledgements may be used as an indicator of the buffer bloating in the network. This signal may be used by, for example, a TCP connection, to make non-aggressive rate reduction decisions. A person of skill in the art will notice that bandwidth availability measurement is not taken solely from the switches, rather it is a cooperation between the switches and hosts to determine the safest increase in bandwidth for all flows.

Thus, existing protocols may be enriched by the extra signals provided by the control packet service. For example, TCP New Reno may be extended by adding two functions; namely 'scoutIncreaseCWND(s)' and 'scoutDecreaseCWND(d)' to create a "TCP+Scout" version. The increase function is defined as a linear function of the number of received control packets (also called scouts) as shown in Equation 1.

$$\text{cwnd} \leftarrow \text{cwnd} + L + \alpha \cdot S \tag{1}$$

In addition, the scout decrease function is set to use a quadratic function as shown in Equation 2.

$$cwnd \leftarrow \begin{cases} cwnd + L + \alpha \cdot S & \text{upon receiving scouts} \\ cwnd \cdot (1 - \min(\beta(t - TH)^2, 1/2)) & t > th1 \end{cases} \tag{2}$$

Where L is the normal packet size, a is a scaling factor that is set to 1, th1 is a threshold that defines when the TCP+Scout should react, and TH is the decrement function parameters. th1 and TH are set to the minimum RTT and five times the RTT respectively. Comparing TCP New Reno and the TCP+Scout service, while both have a slow start with congestion avoidance phases, TCP+Scout uses extra information provided by the scouts to increase the congestion windows safely and faster than the original TCP. TCP+Scout increases CWND by a factor α of the number of received scouts, referred to as bandwidth credit (bw_cr), as shown in Equation 3.

$$cwnd \leftarrow cwnd + \alpha \cdot bw\_cr \qquad (3)$$

In addition, TCP New Reno will keep increasing the congestion window (CWND) until packet loss occurs. However, in TCP+Scout, the queue busy time (t) is calculated by detecting the delay in scout packets as shown in Equation 4.

$$t = \text{TimeElapsedSinceLastScout} - RTT \qquad (4)$$

Such a modification allows TCP+Scout to start to react earlier in order to avoid congestion and packet loss. The rate reduction process is defined using the quadratic function shown in Equation 5.

$$cwnd \leftarrow cwnd \cdot (1 - \min(\beta(t-TH)^2, 1/2)) \qquad (5)$$

Enriching existing protocols such as TCP with the control packet (scout) service allows for better bandwidth recovery and faster reaction times. The early reaction prevents buffer bloating, consequentially, it reduces latency and jitter. In addition, it allows the TCP+Scout system to operate very close to the maximum resource occupancy.

In some embodiments, the control packet service is used to measure the number of active data flows. The number of data flows sharing a data path is obtained by a difference of a number of control packets measured by a data-plane device over two measurement periods of fixed time length, divided by a number of control packets per flow per the fixed time length.

By knowing the number of active data flows, hosts may increase their transmission rate in one RTT directly to their fair share. To get the number of distinct values in a list of size n, unique items must be identified first which requires iterating over all values and verifying if an item has been encountered before. Such a process has a complexity of $O(n)$. In addition, the list of unique values requires a memory space of size m, where m is the number of unique items, which is less than the number of items n. Such methods are not feasible in line rate inside network devices. The control packet service may thus be used to count the number of active flows going through an output port in $O(T)$ time unit and $O(1)$ memory space, where T≥RTT. Each host sends N scout packets per flow within a fixed time period T. If the control packet service is used per host pair, control packets must carry the number of flows between such two pairs. T thus represents the control inter-packet interval and T is required to be a fixed value for all flows. The switch may then use a simple counter to count the number of control packets per output port. The switch updates control packets by adding the value of the control packet counter before transmission if the existing value is less than the newly measured value. Moreover, switches may use a Discounting Rate Estimator (DRE) to update and read the counter in real-time. With such an approach, the active flow number estimation function is defined as the difference between the counter value at t=i and t=i+1 (FlowNum=Δscout/N). FlowNum is defined per path.

An example system of this may be set up as follows. By setting the number of flows to 10, T=RTT, and the number of control packets per RTT to 5 (N=5), the counter value would be Δscout=50 (which is equal to the number of flows times N), as expected. By adding flow count information to control packets, hosts can adjust transmission rate after one RTT to their fair share by setting the congestion window (CWND) equal to the bandwidth delay product (BDP) divided by the Flow Count. In addition, such methods allow flows to reach maximum link utilization in one RTT.

Figure 6:
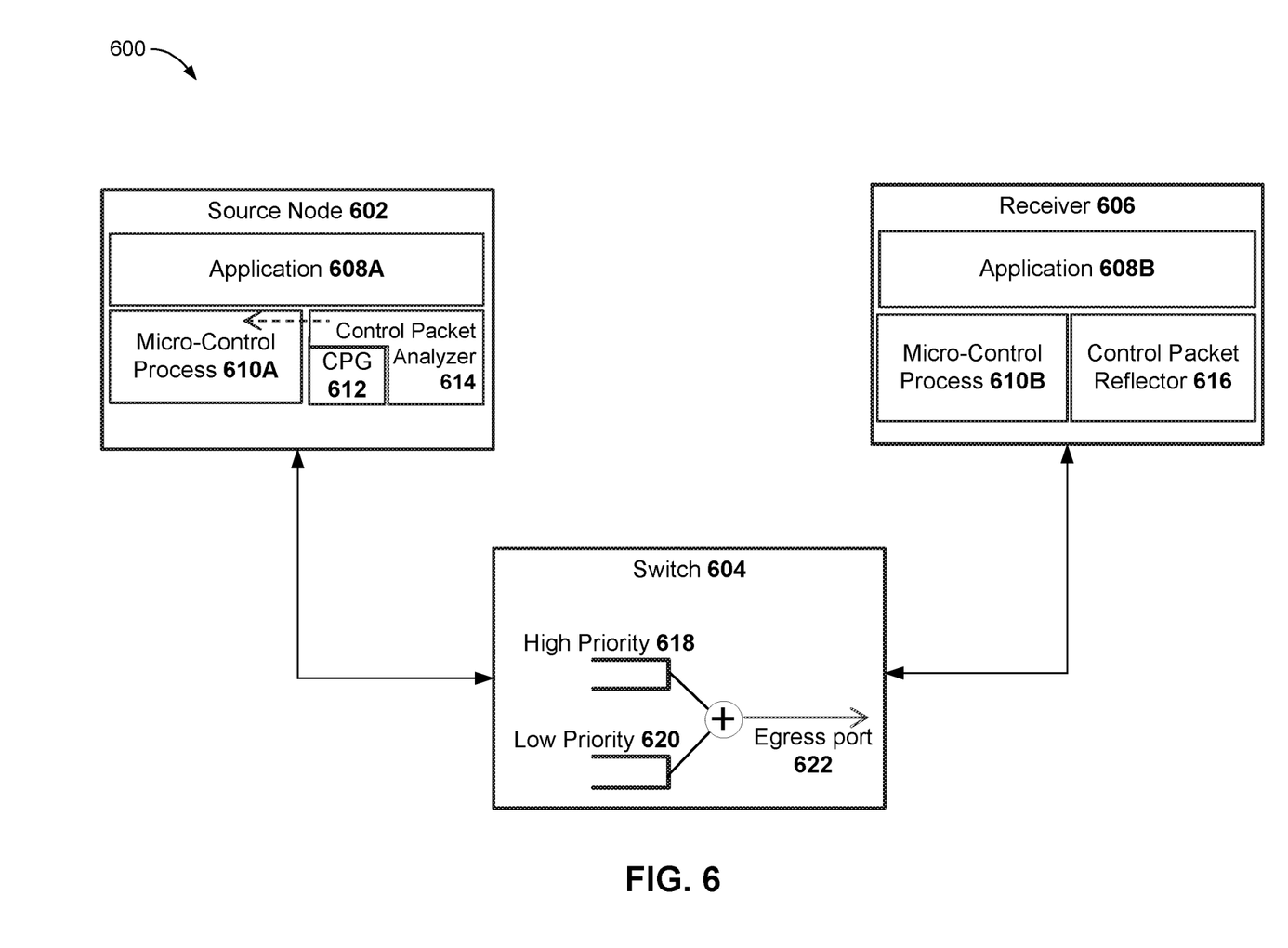
FIG. 6 depicts an example block diagram of a control packet service, according to embodiments.

FIG. 6 depicts an example block diagram 600 of a control packet service. The block diagram 600 includes a source node 602, a switch (data-plane device) 604 and a receiver 606. The source node 602 further includes an application 608A, a micro-control process 610A, a control packet generator (CPG) 612 and a control packet analyzer 614. The switch 604 further includes a high priority queue 618, a low priority queue 620 and an egress port 622. The receiver 606 further includes an application 608B, a micro-control process 610B and a control packet reflector 616. Active data flows may be sent from the micro-control process 610B to the CPG 612. Control packets may be generated by the CPG 612 and sent to the switch 614, where they may be forwarded as low priority data packets to the receiver 606. The control packet reflector 616 at the receiver 606 may then send control packet acknowledgements back to switch 604, which are then forwarded back to the source node 602 for analysis at the control packet analyzer 614. It should be noted that while double headed arrows are shown in the figure to illustrate that communication is sent both to/from the receiver 606 from/to the source node 602, via switch 604, it should be appreciated that the control packet acknowledgements can be sent from receiver 606 to the source node 602, via a different switch (not shown).

Figure 7:
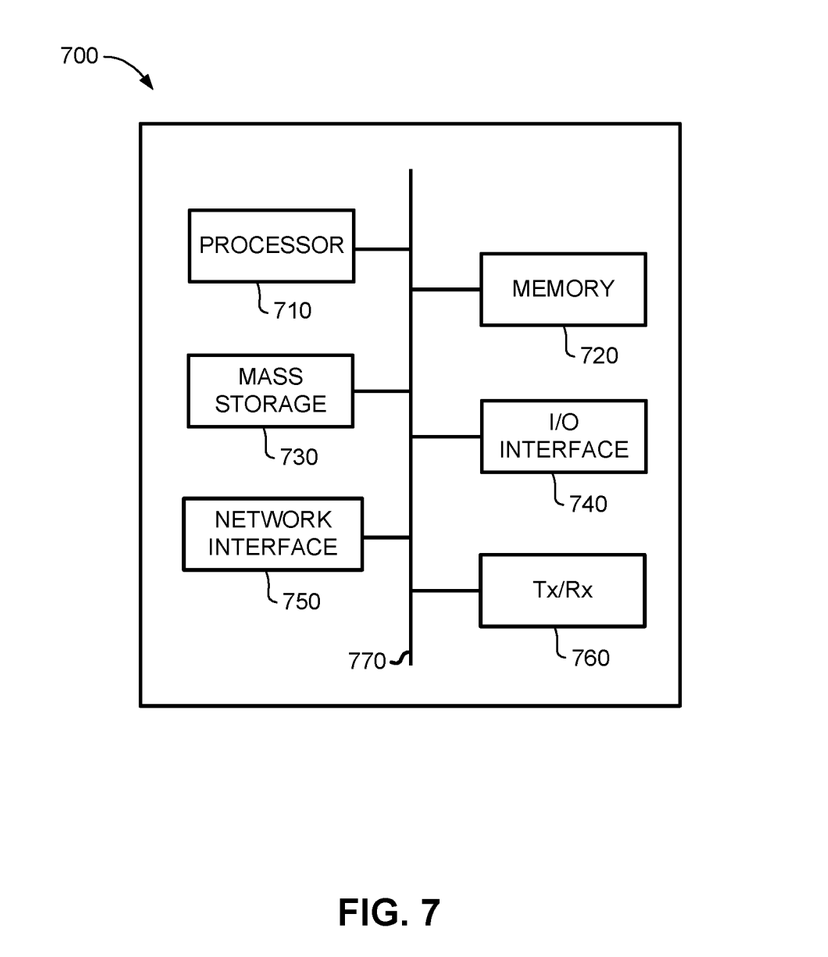
FIG. 7 depicts an example block diagram of an electronic device used for implementing methods disclosed herein, according to embodiments.

FIG. 7 is a schematic diagram of an electronic device 700 that may perform any or all of the steps of the above methods and features described herein, according to different embodiments of the present disclosure. For example, a user equipment (UE), base transceiver station (BTS), base station, wireless gateway or mobility router may be configured as the electronic device. It may be noted that the term "BTS" or "base station" refers to an evolved NodeB (eNB), New Radio (NR) or next generation NodeB (gNodeB or gNB), a radio access node, or another device in a wireless communication network infrastructure, such as a long term evolution (LTE) infrastructure, NR or 5G infrastructure, which performs or directs at least some aspects of wireless communication with wireless communication devices. The term "UE" refers to a device, such as a mobile device, machine-type-communication (MTC) device, machine-to-machine (M2M) equipment, Internet of Things (IoT) device, Internet of Vehicles (IoV) device or other device, which accesses the wireless communication network infrastructure via wireless communication with a base station.

As shown, the device includes a processor 710, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the methods when the computer program product is loaded into memory and executed on the microprocessor of the wireless communication device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for network management, the method comprising:
   receiving at least one data flow;
   transmitting in-band control packets periodically for each of the at least one data flow, the in-band control packets being identified as low priority packets for low priority transmission by data-plane devices, with other packets in the at least one data flow having a higher priority than the in-band control packets, and the data flow being transmitted toward a network device, of the data-plane devices, serving traffic according to priority, such that the in-band control packets are served only when an output port of the network device is idle;
   receiving in-band acknowledgement packets for each of the at least one data flow;
   producing network management data based on received in-band acknowledgement packets, the network management data being produced based in part on a measurement of unutilized packet-serving capacity of the network device, or of a network including the network device, the measurement based on a number of the in-band acknowledgement packets received or a rate of reception of the in-band acknowledgement packets.

2. The method of claim 1, wherein producing network management data based on received in-band acknowledgement packets comprises outputting the network management data for adjusting transmission parameters.

3. The method of claim 1, wherein producing network management data based on received in-band acknowledgement packets comprises adjusting the transmission of the at least one data flow.

4. The method of claim 1, wherein the in-band control packets are transmitted at regular time periods.

5. The method of claim 2, wherein the network management data indicates congestion based on at least one of:
   a number of in-band control packets received;
   a number of in-band control packets delayed;
   a data packet queue build-up;
   a number of data flows sharing a data path; and
   an inter-arrival time between consecutively received in-band acknowledgement packets.

6. The method of claim 5, wherein the number of data flows sharing the data path is obtained by a difference of a number of control packets measured at a receiver of the control packets, a sender of the control packets, or a combination thereof, which is counted accumulatively for all flows at or by a data-plane device, over two measurement periods of fixed time length, divided by a number of control packets per flow per the fixed time length.

7. The method of claim 1, wherein receiving the at least one data flow is performed by a control packet generator at a source node.

8. The method of claim 1, wherein transmitting in-band control packets periodically for each of the at least one data flow is performed by a control packet generator at a source node.

9. The method of claim 1, wherein receiving in-band acknowledgement packets for each of the at least one data flow is performed by a control packet analyzer at the source node.

10. The method of claim 1, wherein producing network management data based on received in-band acknowledgement packets is performed by a micro-control process at the source node.

11. An apparatus comprising:
   a processor; and
   a non-transient computer readable memory having stored instructions which when executed by the processor configure the apparatus to:
   receive at least one data flow;
   transmit in-band control packets periodically for each of the at least one data flow, the in-band control packets being identified as low priority packets for low priority transmission by data-plane devices, with other packets in the at least one data flow having a higher priority than the in-band control packets, and the data flow being transmitted toward a network device, of the data plane devices, serving traffic according to priority, such that the in-band control packets are served only when an output port of the network device is idle;

receive in-band acknowledgement packets for each of the at least one data flow;

produce network management data based on received in-band acknowledgement packets, the network management data being produced based in part on a measurement of unutilized packet-serving capacity of the network device, or of a network including the network device, the measurement based on a number of the in-band acknowledgement packets received or a rate of reception of the in-band acknowledgement packets.

12. The apparatus of claim 11, wherein to produce network management data based on received in-band acknowledgement packets comprises to output the network management data for adjusting transmission parameters.

13. The apparatus of claim 11, wherein to produce network management data based on received in-band acknowledgement packets comprises to adjust the transmission of the at least one data flow.

14. The apparatus of claim 11, wherein the in-band control packets are transmitted at regular time periods.

15. The apparatus of claim 12, wherein the network management data indicates congestion based on at least one of:
a number of in-band control packets received;
a number of in-band control packets delayed;
a data packet queue build-up;
a number of data flows sharing a data path; and
an inter-arrival time between consecutively received in-band acknowledgement packets.

16. The apparatus of claim 15, wherein the number of data flows sharing the data path is obtained by a difference of a number of control packets measured at a receiver of the control packets, a sender of the control packets, or a combination thereof, which is counted accumulatively for all flows at or by a data-plane device over two measurement periods of fixed time length, divided by a number of control packets per flow per the fixed time length.

17. The apparatus of claim 11, wherein receiving the at least one data flow is performed by a control packet generator at the device.

18. A system comprising a source node, a receiver and a data-plane device, wherein
the source node is configured to:
receive at least one data flow;
transmit in-band control packets periodically for each of the at least one data flow, the in-band control packets being identified as low priority packets for low priority transmission by the data-plane device, with other packets in the at least one data flow having a higher priority than the in-band control packets, and the data flow being transmitted toward the data-plane device;
receive in-band acknowledgement packets for each of the at least one data flow;
produce network management data based on received in-band acknowledgement packets, the network management data being produced based in part on a measurement of unutilized packet-serving capacity of the data-plane device, or of a network including the data-plane device, the measurement based on a number of the in-band acknowledgement packets received or a rate of reception of the in-band acknowledgement packets;
the receiver is configured to:
receive in-band control packets for each of the at least one data flow;
transmit in-band acknowledgement packets for each of the at least one data flow; and
the data-plane device is configured to:
serve traffic according to priority, such that the in-band control packets are served only when an output port of the data-plane device is idle.

19. A method for network management, the method comprising:
receiving at least one data flow;
transmitting in-band control packets periodically for each of the at least one data flow;
receiving in-band acknowledgement packets for each of the at least one data flow;
producing network management data based on received in-band acknowledgement packets, wherein producing the network management data based on received in-band acknowledgement packets comprises outputting the network management data for adjusting transmission parameters,
the network management data indicates congestion based on at least one of:
a number of in-band control packets received;
a number of in-band control packets delayed;
a data packet queue build-up;
a number of data flows sharing a data path; and
an inter-arrival time between consecutively received in-band acknowledgement packets; and
the number of data flows sharing the data path is obtained by a difference of a number of control packets measured by a data-plane device over two measurement periods of fixed time length, divided by a number of control packets per flow per the fixed time length.

20. An apparatus comprising:
a processor; and
a non-transient computer readable memory having stored instructions which when executed by the processor configure the apparatus to:
receive at least one data flow;
transmit in-band control packets periodically for each of the at least one data flow;
receive in-band acknowledgement packets for each of the at least one data flow;
produce network management data based on received in-band acknowledgement packets, wherein to produce network management data based on received in-band acknowledgement packets comprises to output the network management data for adjusting transmission parameters,
the network management data indicates congestion based on at least one of:
a number of in-band control packets received;
a number of in-band control packets delayed;
a data packet queue build-up;
a number of data flows sharing a data path; and
an inter-arrival time between consecutively received in-band acknowledgement packets; and
the number of data flows sharing the data path is obtained by a difference of a number of control packets measured by a data-plane device over two measurement periods of fixed time length, divided by a number of control packets per flow per the fixed time length.

* * * * *